(12) United States Patent
Stager et al.

(10) Patent No.: US 8,195,636 B2
(45) Date of Patent: Jun. 5, 2012

(54) PREDICTING SPACE RECLAMATION IN DEDUPLICATED DATASETS

(75) Inventors: Roger Stager, Livermore, CA (US); Pawan Saxena, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 491 days.

(21) Appl. No.: 12/432,220

(22) Filed: Apr. 29, 2009

(65) Prior Publication Data
US 2010/0281081 A1 Nov. 4, 2010

(51) Int. Cl.
G06F 17/30 (2006.01)
G06F 17/00 (2006.01)
(52) U.S. Cl. .................. 707/707; 707/662; 711/165
(58) Field of Classification Search ............ 707/200 O, 707/9 X, 707, 662; 711/165 X, 165
See application file for complete search history.

(56) References Cited

U.S. PATENT DOCUMENTS

| 7,693,877 B1 * | 4/2010 | Zasman | 707/707 |
| 7,822,939 B1 * | 10/2010 | Veprinsky et al. | 711/170 |
| 2008/0005141 A1 * | 1/2008 | Zheng et al. | 707/101 |

* cited by examiner

Primary Examiner — VanThu Nguyen
(74) Attorney, Agent, or Firm — Perkins Coie LLP

(57) ABSTRACT

A technique for determining an amount of storage space that would be recovered in a storage system by deleting a list of logical containers of data is provided. In one embodiment, data blocks referenced by the list of files are first identified. The data blocks (e.g., deduplicated data blocks) may be referenced by two or more files. A number of references made by the identified list of files to each data block is compared against a number of references made by all files stored in a dataset of the storage system. A total amount of storage space is then calculated based on a sum of storage spaces utilized by each data block for which the two reference numbers match. This total amount of storage space is the storage space that would be reclaimed through deletion of the identified list of files.

36 Claims, 8 Drawing Sheets

PREDICTING SPACE RECLAMATION IN DEDUPLICATED DATASETS

FIELD OF THE INVENTION

At least one embodiment of the present invention pertains to data storage systems, and more particularly, to a technique for predicting an amount of storage space that would be reclaimed through deletion of logical containers of data in a deduplicated dataset.

BACKGROUND

A network storage controller is a processing system that is used to store and retrieve data on behalf of one or more hosts on a network. A storage server is a storage controller that operates on behalf of one or more clients to store and manage data in a set of mass storage devices, such as magnetic or optical storage-based disks or tapes. Some storage servers are designed to service file-level requests from clients, as is commonly the case with file servers used in a network attached storage (NAS) environment. Other storage servers are designed to service block-level requests from clients, as with storage servers used in a storage area network (SAN) environment or virtual tape (VTL) environment. Still other storage servers are capable of servicing both file-level requests and block-level requests, as is the case with certain storage servers made by NetApp, Inc. of Sunnyvale, Calif.

In a large-scale storage system, such as an enterprise storage network, it is common for certain items of data, such as certain data blocks, to be stored in multiple places in the storage system, sometimes as an incidental result of normal operation of the system and other times due to intentional copying of data. For example, duplication of data blocks may occur when two or more logical containers of data (e.g., files, virtual tapes, etc.) have some data in common or where a given set of data occurs at multiple places within a given logical container of data. Duplication can also occur if the storage system backs up data by creating and maintaining multiple persistent point-in-time images, or "snapshots," of stored data over a period of time. Data duplication generally is not desirable, since the storage of the same data in multiple places consumes extra storage space, which is a limited resource.

Consequently, in many large-scale storage systems, storage controllers have the ability to "deduplicate" data, which is the ability to identify and remove duplication of data blocks. In one known approach to deduplication, any extra (duplicate) copies of a given data block are deleted (or, more precisely, marked as free), and any references (e.g., pointers) to those duplicate blocks are modified to refer to the one remaining instance of that data block. A result of this process is that a given data block may end up being shared by two or more logical containers of data.

A problem with at least one known deduplication technique is that it is difficult to predict the amount of storage space that would be recovered in the storage system through deletion of one or more logical containers of data. Since storage space of the storage system is a limited resource, a user of the storage system may wish to delete one or more logical containers of data to reclaim a desired amount of storage space in the storage system. However, deletion of a logical container of data does not necessarily ensure that the data block (or data blocks) referenced by the logical container of data gets deleted in a system that employs deduplication. Because a data block may be shared by two or more logical containers of data, a data block will not be deleted at least until all logical containers of data pointing to the data block have been deleted, in order for the system to function properly. Therefore, deletion of a logical container of data does not guarantee that a corresponding amount of storage space will be reclaimed, because some of the blocks of the deleted file may be shared by other logical containers of data. Consequently, in some instances, a user of the storage system may spend a substantial amount of time deleting a large quantity of logical containers of data in the storage system, only to discover at the end of the deletion process that little, if any, storage space is actually reclaimed in the storage system.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Methods and systems for determining an amount of storage space that would be recovered in a storage system by deleting one or more files (or other types of logical containers of data such as virtual tapes) are introduced here. It is understood that the use of the term file herein refers to any type of logical container of data. To accomplish this, in at least one embodiment, the data blocks referenced by a list of files (that are targeted for deletion) are first identified. Any of the identified data blocks may be referenced by two or more files (i.e., the data blocks may be shared by two or more files). An example of such a data block is a deduplicated data block. A number of references made by the identified list of files to each data block is compared against a number of references made by all files stored in a dataset of the storage system. When the two reference numbers match for a particular data block, this means that the data block is not referenced by any file other than the files in the list of files; therefore, the particular data block will be deleted when the list of files are deleted from the storage system. A total amount of storage space is then calculated based on a sum of storage spaces utilized by each data block for which the two reference numbers match. This total amount of storage space is the storage space that would be reclaimed through deletion of the identified list of files. As such, a user can use this technique to predict an amount of space that would be reclaimed in a storage system by deleting one or more files before commencing the deletion process.

Figure 1:
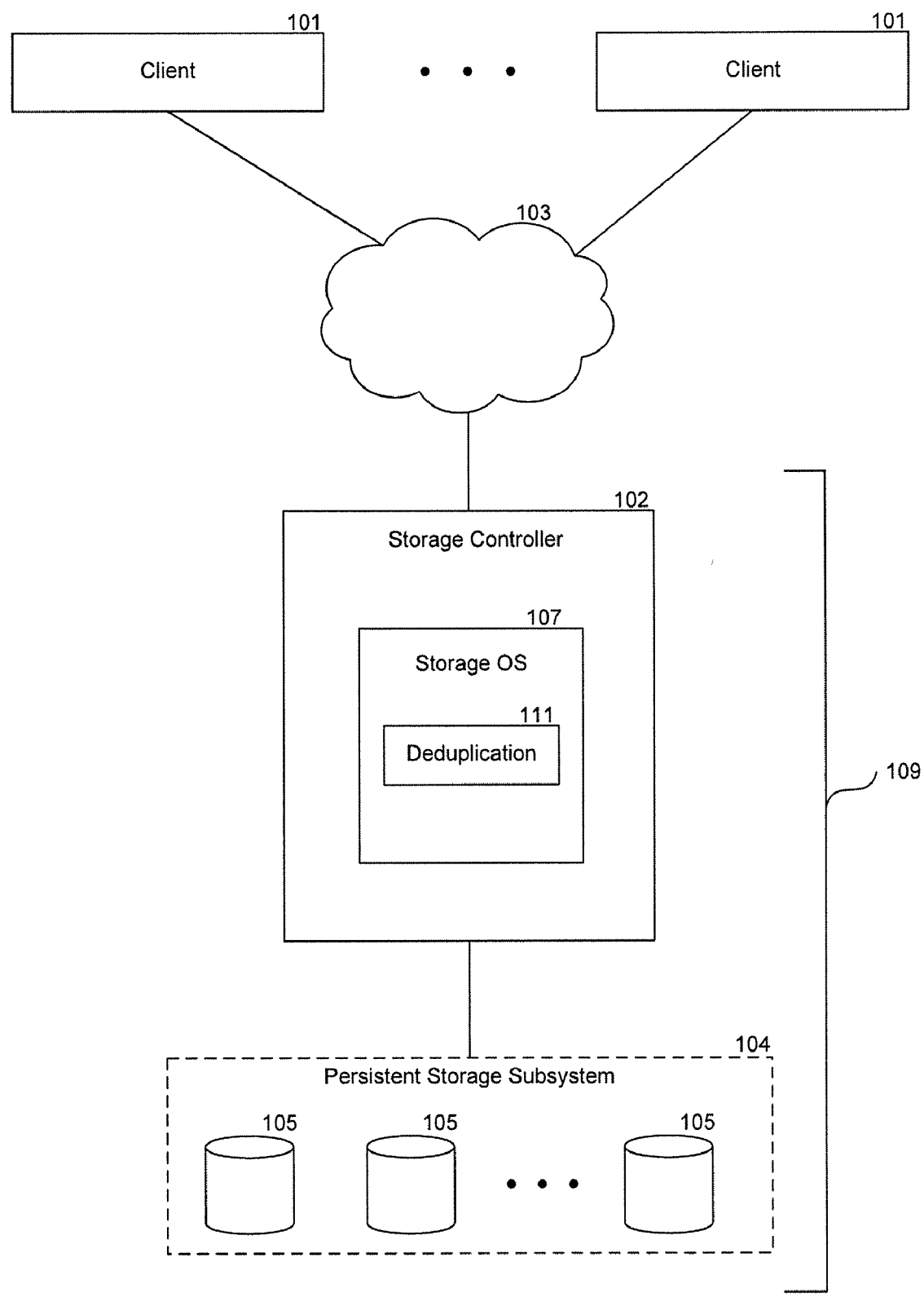
FIG. 1 shows a network storage system in which the technique introduced here can be implemented.

Refer now to FIG. 1, which shows a network storage system in which the technique being introduced here can be implemented. In FIG. 1, a storage controller 102 is coupled to a storage subsystem 104 and to a set of clients 101 through an interconnect 103. The interconnect 103 may be, for example, a local area network (LAN), wide area network (WAN), metropolitan area network (MAN), global area network such as the Internet, a Fibre Channel fabric, or any combination of such interconnects. Each of the clients 101 may be, for example, a conventional personal computer (PC), server-class computer, workstation, handheld computing/communication device, or the like.

Storage of data in the storage subsystem 104 is managed by the storage controller 102 configured to operate as a storage server. The storage controller 102 and the storage subsystem 104 are collectively referred to herein as the storage system 109. The storage controller 102 receives and responds to various read and write requests from the clients 101, directed to data stored in or to be stored in storage subsystem 104. The storage subsystem 104 includes a number of nonvolatile mass storage devices 105, which can be, for example, conventional magnetic or optical disks or tape drives; alternatively, they can be non-volatile solid-state memory, such as flash memory, or any combination of such devices. The mass storage devices 105 in storage subsystem 104 can be organized as a Redundant Array of Inexpensive Disks (RAID), in which case the storage controller 102 can access the storage subsystem 104 using a conventional RAID algorithm for redundancy.

The storage controller 102 includes a storage operating system 107, which is responsible for managing storage of data in the storage subsystem 104, servicing requests from clients 10l, and performing various other types of storage related operations. In the illustrated embodiment, the storage operating system 107 includes a deduplication subsystem 111 which performs deduplication of data blocks. In other embodiment, the deduplication subsystem 111 may be a separate component from the storage operating system 107. In certain embodiments, the storage operating system 107 and deduplication subsystem 111 are both implemented in the form of software (executed by one or more programmable processors). In other embodiments, however, either or both of these elements may be implemented in pure hardware, e.g., specially-designed dedicated circuitry, or as a combination of software and specially-designed dedicated circuitry.

The storage controller 102 can be, for example, a storage server which provides file-level data access services to clients, such as commonly done in a NAS environment, or block-level data access services such as commonly done in a SAN environment, or it may be capable of providing both file-level and block-level data access services to hosts. Further, although the storage controller 102 is illustrated as a single unit in FIG. 1, it can have a distributed architecture. For example, the storage controller 102 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect, in a cluster configuration. In some instances, the deduplication 111 system is implemented as part of the D-blade of such an architecture.

Figure 2:
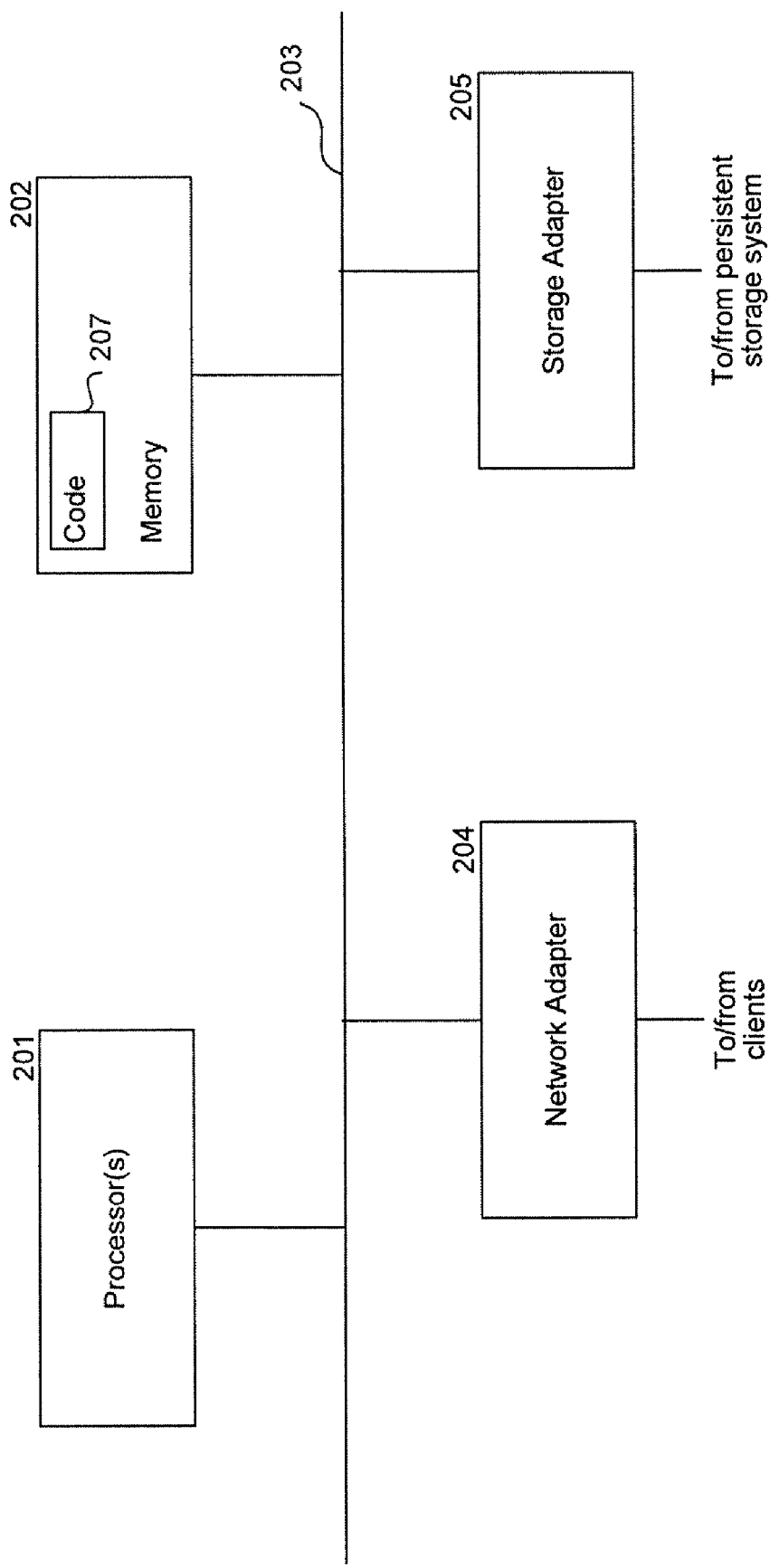
FIG. 2 is a high-level block diagram showing an example of the architecture of a storage controller.

FIG. 2 is a high-level block diagram showing an example of the architecture of the storage controller 102. The storage controller 102 includes one or more processors 201 and memory 202 coupled to an interconnect 203. The interconnect 203 shown in FIG. 2 is an abstraction that represents any one or more separate physical buses, point-to-point connections, or both, connected by appropriate bridges, adapters, or controllers. The interconnect 203, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 201 is/are the central processing unit (CPU) of the storage controller 102 and, thus, control the overall operation of the storage controller 102. In certain embodiments, the processor(s) 21 accomplish this by executing software or firmware stored in memory 202. The processor(s) 201 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 202 is or includes the main memory of the storage controller 102. The memory 202 represents any form of random access memory (RAM), read-only memory (ROM), flash memory, or the like, or a combination of such devices. In use, the memory 202 may contain, among other things, code 207 embodying the storage operating system 107 and/or the deduplication subsystem 111.

Also connected to the processor(s) 201 through the interconnect 203 are a network adapter 204 and a storage adapter 205. The network adapter 204 provides the storage controller 102 with the ability to communicate with remote devices, such as clients 101, over the interconnect 203 and may be, for example, an Ethernet adapter or Fibre Channel adapter. The storage adapter 205 allows the storage controller 102 to access the storage subsystem 104 and may be, for example, a Fibre Channel adapter or SCSI adapter.

Figure 3:
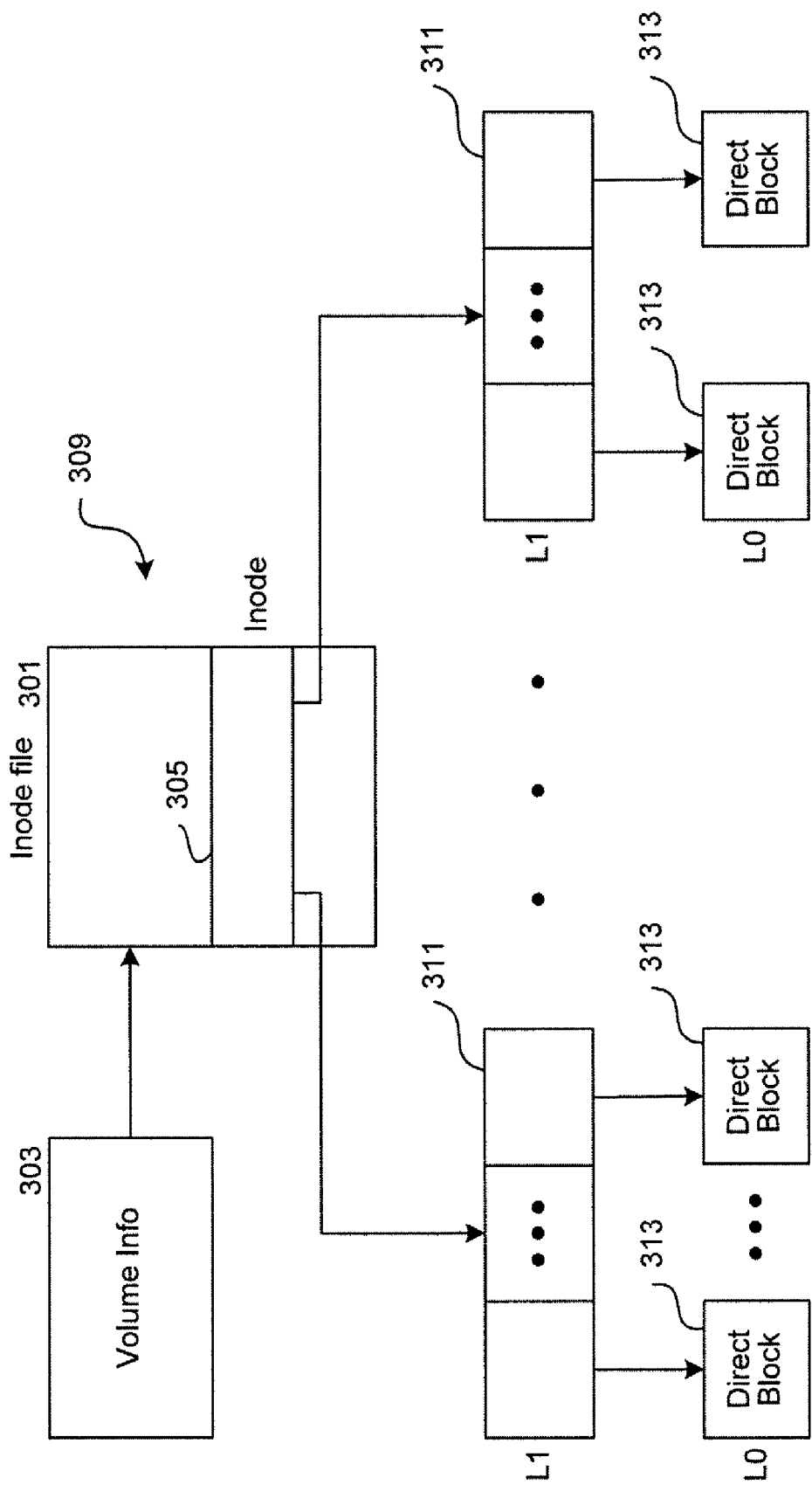
FIG. 3 shows an example of a buffer tree and the relationship between inodes, an inode file and the buffer tree.

It is useful now to consider how data can be structured and organized by the storage system 109. Reference is now made to FIG. 3 in this regard. In at least one embodiment, data is stored in the form of volumes, where each volume contains one or more directories, subdirectories and/or files. The term "aggregate" is used to refer to a pool of storage, which combines one or more physical mass storage devices (e.g., disks) or parts thereof into a single logical storage object. An aggregate contains or provides storage for one or more other logical data sets at a higher level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more directories, subdirectories and files.

In certain embodiments, a file (or other form of logical data container, such as a logical unit or "LUN") is represented in a storage system 109 in the form of a hierarchical structure called a "buffer tree". A buffer tree is a hierarchical structure which is used to store file data as well as metadata about a file, including pointers for use in locating the data blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks") of the file. All of the data in the file is stored only at the lowest level (L0) blocks.

The root of a buffer tree is the "inode" of the file. An inode is a metadata container that is used to store metadata about the file, such as ownership, access permissions, file size, file type, and pointers to the highest level of indirect blocks for the file. Each file has its own inode. The inode is stored in a separate inode file, which may itself be structured as a buffer tree.

FIG. 3 shows an example of a buffer tree 309 for a file. The file is assigned an inode 305, which references Level 1 (L1) indirect blocks 311. Each indirect block 311 stores two or more pointers to a lower-level block, e.g., a direct block 313. Each pointer in an L1 and indirect block 311 references a physical block 313 in a storage device (i.e., in the aggregate).

For each volume managed by the storage controller 102, the inodes of the files and directories in that volume are stored in a separate inode file, such as inode file 301 in FIG. 3 which stores inode 305. A separate inode file is maintained for each volume. The location of the inode file for each volume is stored in a Volume Information ("VolumeInfo") block associated with that volume, such as VolumeInfo block 303 in FIG. 3. The VolumeInfo block 303 is a metadata container that contains metadata that applies to the volume as a whole. Examples of such metadata include, for example, the volume's name, type, size, any space guarantees to apply to the volume, and a pointer to the location of the inode file of the volume.

As indicated above, in one embodiment, the techniques described herein apply to a situation where the logical containers of data are virtual tapes. Such a virtual tape library system appears to the storage system 109 as a remote tape drive, allowing the storage system 109 to perform conventional data operations using conventional tape software. The components of a virtual tape library system, and the associated details of virtual tapes, are described in detail in U.S. patent application Ser. No. 11/756,044, entitled "System and Method for Accelerating Anchor Point Detection," which is incorporated herein in its entirety.

Figure 4A:
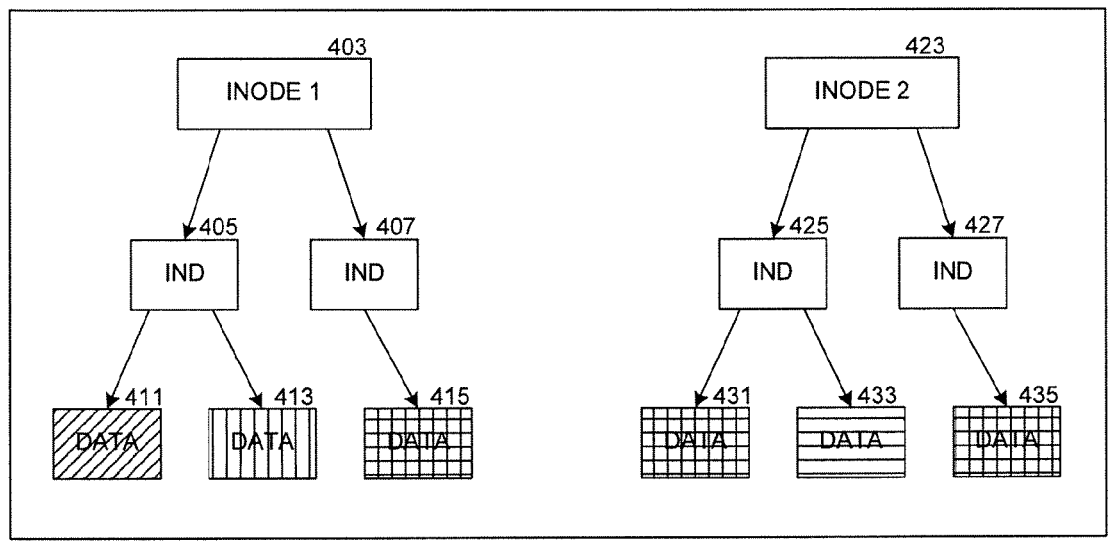
FIGS. 4A and 4B illustrate an example of two buffer trees before and after deduplication of data blocks, respectively.
Figure 4B:
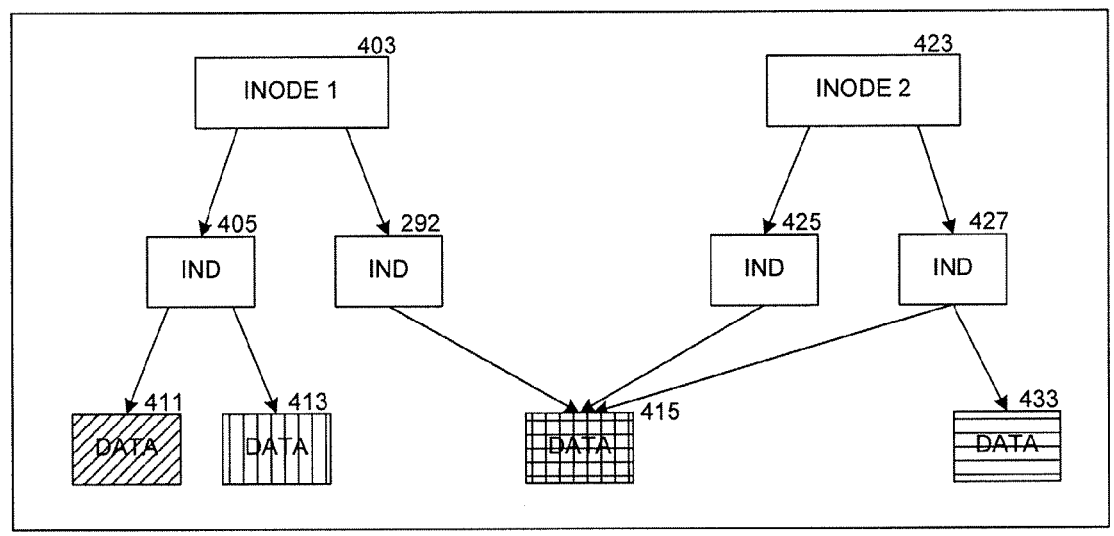

Now consider the process of deduplication. FIGS. 4A and 4B show an example of the buffer trees of two files, where FIG. 4A shows the two buffer trees before deduplication and FIG. 4B shows the two buffer trees after deduplication. The root blocks of the two files are Inode 1 403 and Inode 2 423, respectively. The numerals in FIGS. 4A and 4B are the values of the pointers to the various blocks and, in effect, therefore, are the identifiers of the data blocks. The fill patterns of the direct (L0) blocks in FIGS. 4A and 4B indicate the data content of those blocks, such that blocks shown with identical fill patterns are identical. It can be seen from FIG. 4A, therefore, that data blocks 415, 431, and 435 are identical.

The result of deduplication is that these three data blocks are, in effect, coalesced into a single data block, identified by pointer 415, which is now shared by the indirect blocks that previously pointed to data block 431 and data block 435. Further, it can be seen that data block 415 is now shared by both files. In a more complicated example, data blocks can be coalesced so as to be shared between volumes or other types of logical containers. Note that this coalescing operation involves modifying the indirect blocks that pointed to data blocks 431 and 435, and so forth, up to the root node. In a write out-of-place file system, that involves writing those modified blocks to new locations on disk.

The collection of the coalesced data blocks, along with the references pointing (e.g., the logical containers of data) to the coalesced data blocks are referred to herein as a "dataset." In some instances, the dataset may be, for example, a particular volume (or other types of logical containers) of the storage system 109. In other instances, the dataset may include, for example, multiple volumes (or other types of logical containers) of the storage system 109.

To identify duplicate data blocks, a hash function, such as MD5, SHA-1, SHA-256 or SHA-512, can be applied to all used (unfree) data blocks in the data set to be deduplicated. The output of the hash function is a value for each data block, called a fingerprint, where identical data blocks will always have the same fingerprint. By comparing the fingerprints during a subsequent deduplication process, duplicate data blocks can be identified and coalesced. Data blocks with identical fingerprints are possible duplicates. Once possible duplicates are identified from their fingerprints, a byte-by-byte comparison of those possible duplicates can be done to determine whether they are in fact duplicates of each other. Because the fingerprint of a block is much smaller than the data block, fingerprints for a very large number of data blocks can be stored without consuming a significant portion of the storage capacity in the system.

The deduplication mechanism described above is in reference to a physical tape/file system. The deduplication mechanism may employ a different process (e.g., an anchor point detection based process) when performed in a virtual tape library system. Such a deduplication process is described in U.S. patent application Ser. No. 11/756,044, entitled "System and Method for Accelerating Anchor Point Detection," which is incorporated herein in its entirety.

For purposes of further illustration, the techniques introduced hereafter are described in the context of deduplicated data blocks (in a virtual tape library system or a physical tape/file system, etc.). Deduplicated data blocks, as indicated above, are data blocks that may be referenced by one or more logical containers of data of a storage system. Note, however, that the same basic approach can also be applied to other contexts where data blocks are referenced by one or more logical containers of data without going through a deduplication process. Therefore, it is understood that this basic approach applies generally to situations where an amount of storage space that would be reclaimed by deleting one or logical containers of data is to be determined.

Figures 5A, 5B:
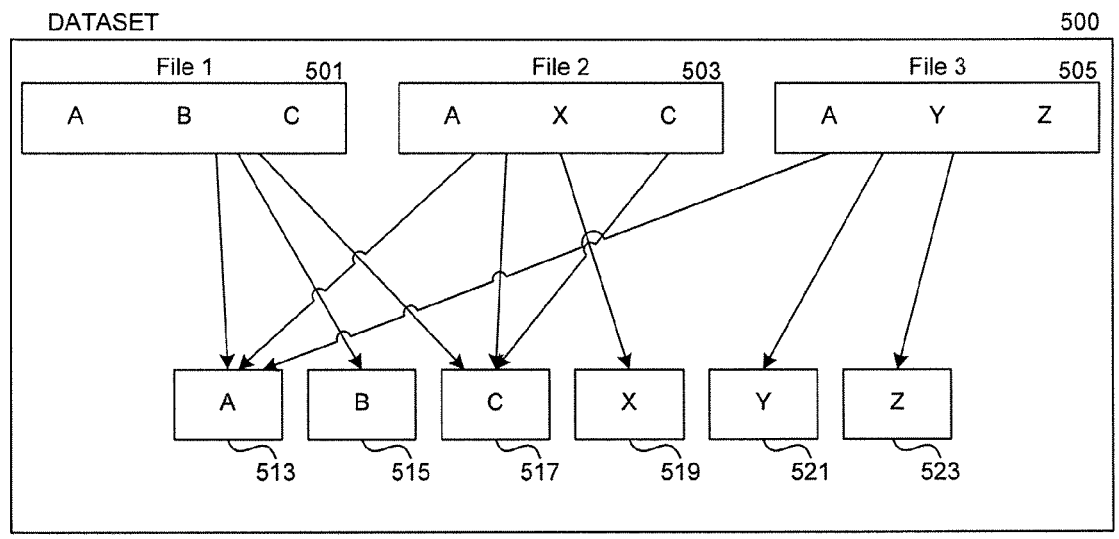
FIG. 5A conceptually illustrates an example of a dataset that includes a number of logical containers of data and data blocks referenced by the logical containers of data.
FIG. 5B illustrates an exemplary computation table for determining an amount of storage space that would be reclaimed by deleting a set of logical containers of data from the dataset.

FIG. 5A shows an example of a dataset 500 of the storage system 109. The dataset 500, as indicated above, can be a storage volume (or other type of logical container) of the storage system 109. In some instances, the dataset 500 may include several (or even all) storage volumes (or other types of logical containers) of the storage system 109. In the example illustrated in FIG. 5A, the dataset 500 includes several logical containers of data (e.g., file 1, file 2, file 3). Each logical container of data in the dataset 500 contains references to one or more data blocks. For example, file 1 contains references to data blocks A, B, and C; file 2 contains references to data blocks A, X, and C; and file 3 contains references to data blocks A, Y, and Z.

As may be observed from the exemplary dataset 500 of FIG. 5A, there are several instances where a single data block may be referenced by two or more logical containers of data. For example, data block A is referenced by file 1, file 2, and file 3. In such instances, the data block would be deleted from the storage system 109 only when all logical containers of data referencing the data block are deleted. Therefore, in the above example, data block A would be deleted from the storage system 109 only when file 1, file 2, and file 3 are all deleted. When, for example, only file 1 and file 2 are deleted, data block A would not be deleted from the storage system 109, because it is referenced by at least one remaining logical container of data (i.e., file 3).

FIG. 5B illustrates an example of a computation table 631, used by the technique introduced here, for determining an amount of storage space that would be reclaimed by deleting a set of logical containers of data from the dataset 500. In the example illustrated in FIG. 5B, the set of logical containers of data includes file 1 501, file 2 503, and file 3 505. In one embodiment, a series of parameters are computed for each data block referenced by the set of logical containers of data. The following parameters, for example, are computed for each data block: a reference count 535, an overall reference count 537, a match comparison 539, and a storage size of a matched data block 541. The reference count 535 of a data block, as defined herein, is a number of references made to the data block by the set of logical containers of data (that are being considered for deletion). The overall reference count 537 of the data block, as defined herein, is a number of references made to the data block by all logical containers of data in the dataset 500. Generally, the set of logical containers of data being considered for deletion is a partial subset (i.e., less than all) of all logical containers of data in the dataset 500 (only the set of logical containers of data is shown in FIG. 5A).

The above mentioned parameters are computed for each data block referenced by the set of logical containers of data being considered for deletion. In an illustrative example, for data block A, the reference count 535 is computed based on the number of references to data block A 513 made by the logical containers of data included in the set of logical containers of data. In this example, as illustrated in FIG. 5A, data block A 513 is referenced by the set of logical containers of data three times (once each by file 1 501, file 2 503, and file 3 505). Therefore, the value of the reference count 535 for data block A is set to "3."

An overall reference count 537 associated with data block A is then identified. In some instances, the dataset 500 maintains the overall reference count associated with each data block (based on the number of references made at any given time to each data block by all files of the dataset 500). In such instances, the value of the overall reference count 537 of a data block is retrieved directly from the dataset. In other instances, the overall reference count 537 of a data block may be dynamically determined by counting the number of references made to the data block by all logical containers of data in the dataset 500. In the example illustrated here, if the overall reference count 537 of data block A is "3," it signifies that data block A is referenced only by three logical containers of data, i.e., the three logical containers of data that make up the set of logical containers of data.

In such a case, where the first reference count 535 of a data block matches the overall reference count 537 associated with the data block, the data block will be deleted from the storage system 109 subsequent to deletion of the first set of logical containers of data. In the example illustrated here, the first reference count 535 of data block A matches the overall reference count 537 associated with data block A, indicating that data block A will be deleted from the storage system 109 when the first set of logical containers of data is deleted. Accordingly, in some instances, data block A is earmarked (i.e., it is as a data block that will be deleted) in a matching comparison 539 section of the computation table 531. In some instances, an intermediary variable or a flag setting associated with a data block is turned on or off to signify that the data block is targeted for deletion. When data block A is earmarked for deletion, a storage size utilized by data block A is captured in a storage size 541 section of the computation table 531.

When the first reference count 535 does not match the overall reference count 537 for a data block (as is the case for data block B in the example illustrated in FIG. 5B), the data block will not be deleted from the storage system 109 when the first set of logical containers of data is deleted. This is because there will be at least one other logical container of data in the dataset 500 that points to the data block after the deletion of the first set of logical containers of data. IN other words, the overall reference count associated with the data block would be a non-zero value even after the first set of logical containers of data is deleted. Therefore, in such a scenario, the storage space utilized by the data block will not be reclaimed when the first set of logical containers of data are deleted. Note that the overall reference count 537 values of data blocks B and Y are based on the respective data blocks referencing other logical containers of data other than files 1, 2, and 3. Such additional logical containers of data are not shown in FIG. 5A.

Additionally, the computation table 531 determines a total amount of storage space 541 that would be reclaimed when all logical containers of data listed in the first set of logical containers of data are deleted. To determine this value, the computation table 531 calculates a total of the storage size utilized by the data blocks for which the first reference count matches the overall reference count. In the example illustrated in FIG. 5B, data blocks A, C, X, and Z would be deleted when the first set of logical containers of data are deleted. Assuming that each of these data blocks utilizes a storage space of 10 KB each, the computation table 531 determines the total amount of storage space 541 (that would be reclaimed) to be 40 KB.

The computation table 531 discussed above is merely for the purpose of illustrating an example of a way of determining an amount of storage space that would be reclaimed by deleting a set of logical containers of data. It is noted that other ways of computing the various parameters of the computation table 531, as understood by people of ordinary skill in the art, may be employed to implement the techniques discussed herein.

Figure 5C:
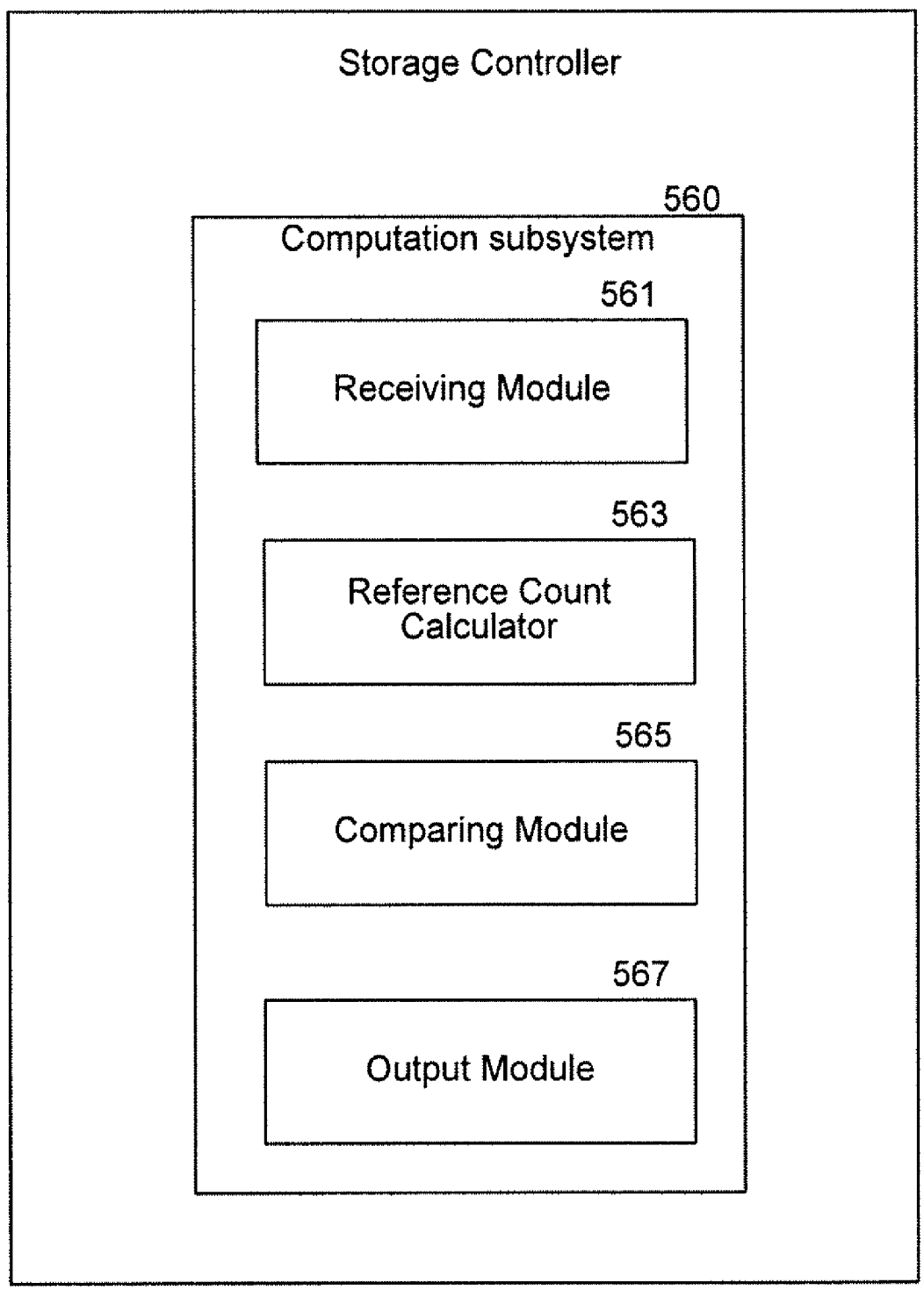
FIG. 5C is a block diagram illustrating an exemplary architecture of a storage controller configured to perform the functions of the computation table.

FIG. 5C is a block diagram illustrating an exemplary architecture of a storage controller 102 configured to perform, for example, the functions of the computation table 531. In the illustrated embodiment, the storage controller includes 102 a computation subsystem 560 which performs computation functions to determine an amount of storage space that would be reclaimed when a set of logical containers of data is deleted from a dataset. The computation subsystem 560 can be implemented by using programmable circuitry programmed by software and/or firmware, or by using special-purpose hardwired circuitry, or by using a combination of such embodiments. In some instances, the computation subsystem 560 is implemented as a unit in the processor 201 of the storage controller 102. In some instances, the computation subsystem 560 communicates with the deduplication 111 block of the storage controller 102 to perform the techniques discussed herein.

In some instances, the computation subsystem 560 includes a receiving module 561 to receive a request to perform computation functions for a particular set of logical containers of data. The computation subsystem 560 may receive the request from a user who submits a list of files he intends to delete by interfacing with, for example, a client 101 of the network storage system. The user may do this prior to deleting a set of logical containers of data to predict an amount of storage space he would recover by deleting the set of logical containers of data. The receiving module identifies the logical containers of data included in the particular set of logical containers of data, and, in some instances, identifies data blocks referenced by each of the logical containers of data.

Further, the computation subsystem 560 of the illustrated embodiment includes a reference count calculator 563. The reference count calculator 563 computes, for example, values of the first reference count (535 of FIG. 5A) and the overall reference count (537 of FIG. 5A) for each identified data block. In some instances, the reference count calculator 563 retrieves the value of the overall reference count from the dataset in which the identified data block is stored. In some instances, the dataset may store an array or another type of database to maintain a list of current references made to each of the data blocks stored in the dataset. In other instances (or when the associated dataset does not maintain the overall reference count value of the identified data block), the reference count calculator 563 dynamically (e.g., by searching through all the inodes in the dataset 500) computes the value of the overall reference count of the identified data block after the data block is identified by the receiving module 561.

A comparing module 565 of the computation subsystem 560 is configured to compare the values of the first reference count and the overall reference count of each identified data block. In some instances, when the comparing module 565 detects that the first reference count value and the overall reference count value matches for a particular data block, the comparing module 565 earmarks the particular data block to indicate that the data block would be deleted if the particular set of logical containers of data was deleted.

Finally, the computation subsystem 560 includes an output module 567 that is configured to compute the overall amount of storage space that would be reclaimed when the particular set of logical containers of data is deleted. In some instances, the output module 567 computes a total of storage spaces utilized by the earmarked data blocks to compute the overall amount of storage space. In some instances, the output module 567 is also configured to display the computed value to a user of the storage system 109 by communicating with an output unit (e.g., a printer, a visual display unit, etc.) associated with the storage controller 102.

Figure 6:
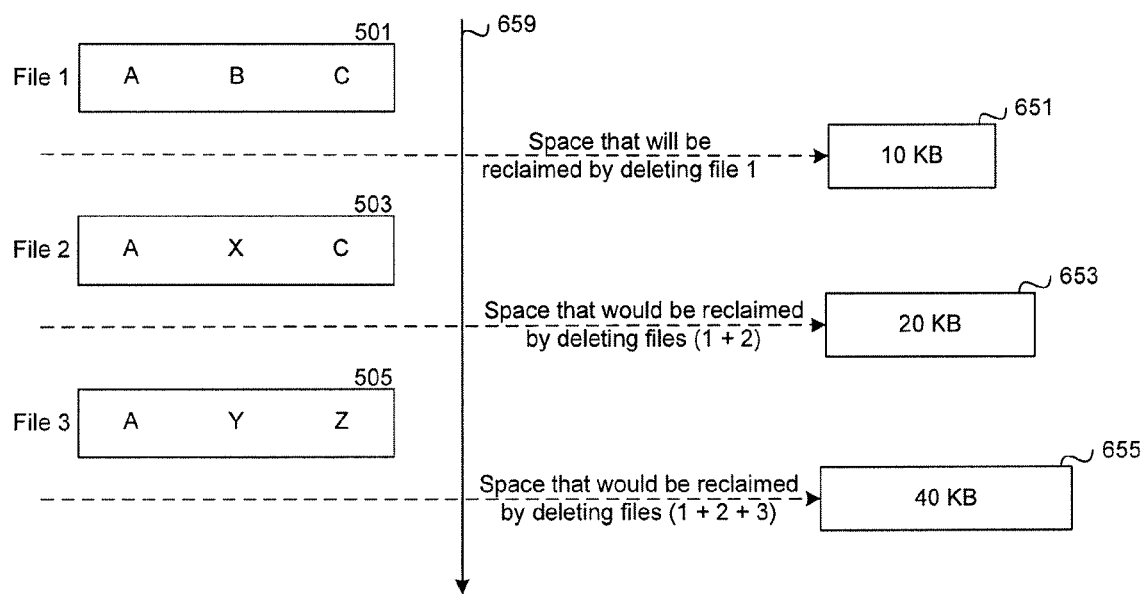
FIG. 6 illustrates an example of computation of sub-storage values for each logical container of data listed in a ordered list of logical containers of data.

FIG. 6 illustrates an example of computation of sub-storage values for each logical container of data listed in a ordered list of logical containers of data. In some instances, a user of the storage system 109 inputs, selects, or specifies a ordered list of logical containers of data for computation of total space that would be reclaimed through deletion of the ordered list of logical containers of data. The ordered list of logical containers of data lists the logical containers of data in a specific order as indicated by the user of the storage system 109. In one example, the specific order may be based on the storage age of the logical containers of data (e.g., arranging the logical containers of data in the order based on a date and/or time at which the logical container of data was originally stored in the dataset 500). In another example, the specific order may be based on a storage size occupied by each logical container of data (e.g., arranging the logical containers of data in the order of their storage size). In another example, the specific order may be based on an importance value associated with the logical containers of data (e.g., critical security files may be listed in the bottom of the list, while redundant backup files may be listed on the top of the list).

In one embodiment, in addition to, or in lieu of, computing the total storage space that would be reclaimed through deletion of the ordered list of logical containers of data, sub-storage values corresponding to each of the logical containers of data are computed. The sub-storage value of each logical container of data is computed based on the direction of calculation. In the illustrated example in FIG. 6, the direction of calculation 659 is from top logical container of data (i.e., file 1 501) to bottom logical container of data (i.e., file 3 505).

In this scenario, the sub-storage value of a particular logical container of data is the amount of storage space that would be reclaimed by deleting the particular logic container and all logic containers listed before the particular logical container of data in the ordered list. Therefore, the sub-storage value for file 1 501 would be an amount of storage space 651 that would be reclaimed through deletion of file 1. The sub-storage value for file 2 503 would be an amount of storage space 653 that would be reclaimed through deletion of file 2 503 and file 1 501, and so on. By making these sub-storage values available to a user of the storage system 109, the user would be able to determine how many logical containers of data need to be deleted from the ordered list of logical containers of data to reclaim a specific amount of storage space. In the illustrated example, if the user needs to reclaim only 20 KB of storage space, the user would need to delete all logical containers of data before and including file 2 503 in the ordered list.

It is understood that the computation of sub-storage values may also be performed in reverse direction (i.e., the direction of calculation 659 is from bottom logical container of data in the ordered list to the top logical data container). In such a scenario, the sub-storage value for a given logical container of data is the amount of storage space that would be reclaimed by deleting the given logical container of data and all logic containers of data listed after the given logic container in the ordered list.

Figure 7:
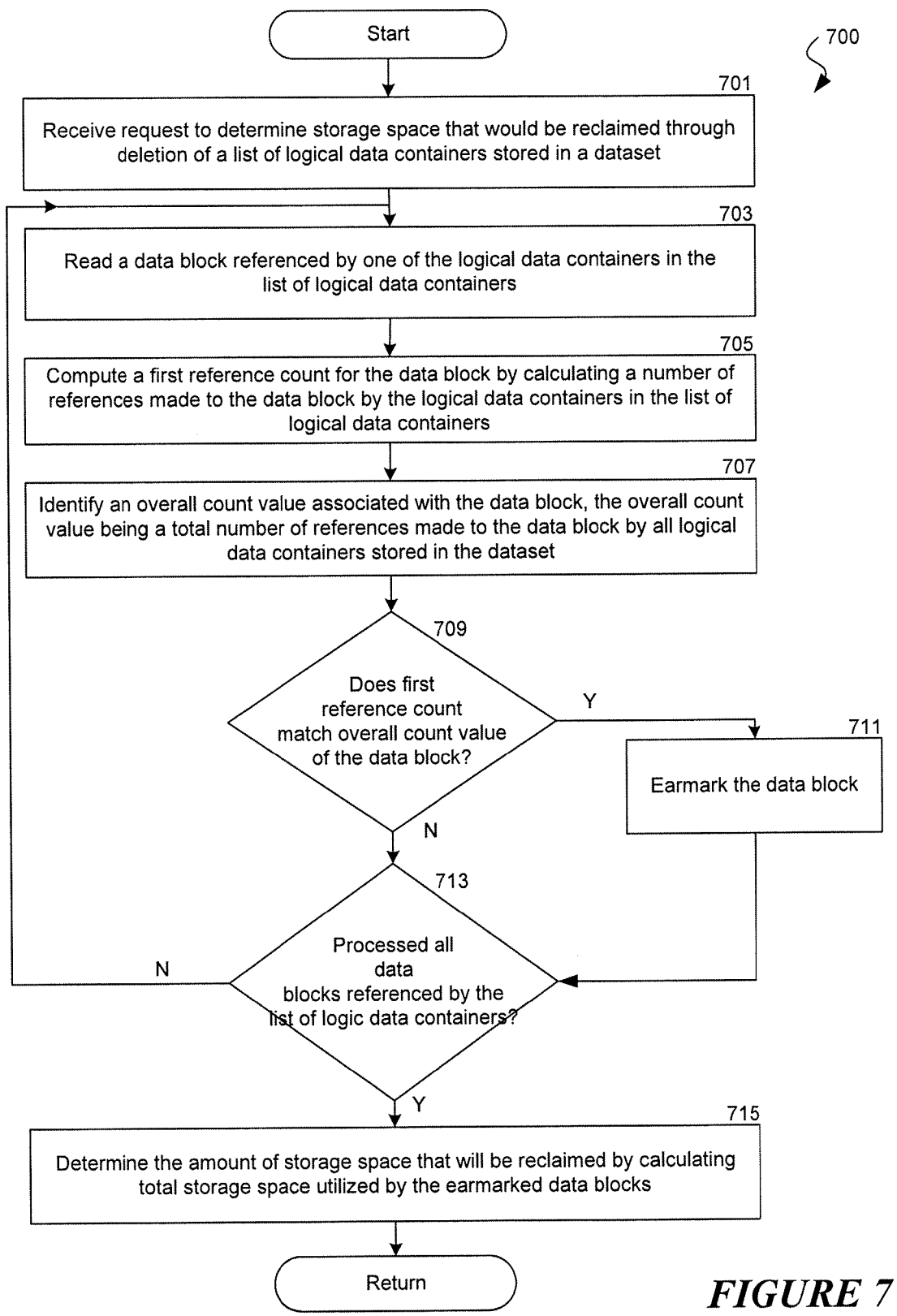
FIG. 7 is a flow diagram showing an example of a process for determining an amount of storage space that would be recovered in a storage system through deletion of a list of logical containers of data.

FIG. 7 is a flow diagram showing an example of a process 700 for determining an amount of storage space that would be recovered in a storage system through deletion of a list of logical containers of data. Initially, at 701, the process 700 receives a request to determine an amount of storage space that would be recovered through deletion of a list of logical containers of data stored in a particular dataset. In some instances, the process 700 receives the request from a user who provides a list of logical containers of data. At 703, the process 700 reads a particular data block that is referenced by one of the logical containers of data from the list of logical containers of data. In some instances, the process 700 selects the data block in the order in which it is referenced by the list of logical containers of data. At 705, the process 700 computes the reference count for the particular data block. The reference count for the particular data block is a number of references made to the particular data block by the logical containers of data in the list of logical containers of data.

At 707, the process 700 determines the overall reference count associated with the particular data block. The overall reference count of the particular data block is a total number of references made to the particular data block by all logical containers of data in the dataset. In some instances, the dataset maintains the overall reference count value of the particular data block. In such instances, the process 700 retrieves the overall reference count value directly from the dataset. In other instances (or in instances where the dataset does not maintain the overall reference count value), the process 700 dynamically computes the overall reference count value of the particular data block.

At 709, the process 700 determines whether the first reference count of the particular data block matches the overall reference count associated with the particular data block. If the two values match, the particular data block would be deleted from the storage system when the logical containers of data in the list are deleted. On the other hand, if the two values do not match (i.e., the overall reference count is greater than the first reference count), the particular data block would not be deleted from the storage system when the list of logical containers of data is deleted.

Accordingly, if the two values match at 709, the process 700 branches to 711, where the process 700 earmarks the data block and subsequently proceeds to 713. If the two values do not match at 709, the process 700 directly proceeds to 713, where the process 700 checks whether all data blocks referenced by the list of logical containers of data have been processed. If the process 700 determines that there are additional data blocks that need to be processed, the process 700 branches back to 703 to read another data block. If the process 700 determines at 713 that all data blocks referenced by the list of logical containers of data have been processed, the process 700 proceeds to 715. At 715, the process 700 computes a total amount of storage space utilized by the earmarked data blocks. This total amount of storage space is the amount of storage space that will be reclaimed when the list of logical containers of data is deleted from the dataset.

Thus, a method and apparatus for determining an amount of storage space that would be recovered by deleting a list of logical containers of data in, for example, a deduplicated data set have been described. The techniques introduced above can be implemented by using programmable circuitry programmed by software and/or firmware, or by using special-purpose hardwired circuitry, or by using a combination of such embodiments. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of determining an amount of storage space that would be reclaimed in a storage system as a result of deletion of a plurality of logical containers of data, the method comprising:
identifying, by the storage system, a plurality of logical containers of data to be deleted from a dataset of a storage system, each of the plurality of logical containers of data including references to one or more data blocks stored in the dataset, an indication of the plurality of logical containers of data having been input into the storage system by a user for determining a total amount of physical storage space that would be freed up in the storage system upon deletion of the plurality of logical containers of data;
calculating, by the storage system, a total number of references made to each individual data block by the identified plurality of logical containers of data; and
determining the total amount of storage space that would be reclaimed through deletion of the identified plurality of logical containers of data, by:
identifying, by the storage system, a total number of individual data blocks, among all data blocks referenced by the identified plurality of logical containers of data for which the total number of references made by the identified logical containers of data matches an overall reference count associated with such individual data blocks, wherein the overall reference count associated with a given data block is an overall number of references made to the given data block by all logical containers of data stored in the dataset;
calculating a total amount of storage space utilized within the storage system by the identified total number of individual data blocks that match the overall reference count; and
determining the calculated overall amount of storage space as the total amount of storage space that would be reclaimed.

2. The method of claim 1, wherein the dataset is a particular storage volume of the storage system.

3. The method of claim 1, wherein the dataset includes a plurality of storage volumes of the storage system.

4. The method of claim 1, wherein the identified plurality of logical containers of data is a partial subset of all logical containers of data stored in the dataset.

5. The method of claim 4, wherein the logical containers of data of the identified plurality of logical containers of data are listed in a specific order as indicated by a user of the storage system, the specific order being one of:
an order based on a storage age of each of the identified plurality of logical containers of data;
an order based on an importance value associated with each of the identified plurality of logical containers of data; or
an order based on a storage size associated with each of the identified plurality of logical containers of data.

6. The method of claim 5, further comprising:
calculating a sub-storage value for each of the identified plurality of logical containers of data, wherein the sub-storage value of a particular logical container of data of the identified plurality of logical containers of data is an amount of storage space that would be reclaimed through deletion of the particular logical container of data and a list of logical containers of data listed before the particular logical container of data in the specific order of the identified plurality of logical containers of data.

7. The method of claim 5, further comprising:
calculating a sub-storage value for each of the identified plurality of logical containers of data, wherein the sub-storage value of a particular logical container of data of the identified plurality of logical containers of data is an amount of storage space that would be reclaimed through deletion of the particular logical container of data and a list of files listed after the particular logical container of data in the specific order of the identified plurality of logical containers of data.

8. The method of claim 1, wherein the overall reference count associated with each of the one or more data blocks is maintained in the dataset.

9. The method of claim 1, wherein the overall reference count associated with each of the one or more data blocks is computed dynamically prior to determining the amount of storage space that would be reclaimed through deletion of the identified plurality of logical containers of data.

10. The method of claim 1, wherein, a particular data block, for which the total number of references matches an associated overall reference count, is deleted from the storage system when the plurality of logical containers of data are deleted from the dataset.

11. The method of claim 1, wherein, a particular data block, for which the total number of references does not match an associated overall reference count, is not deleted from the storage system when the plurality of logical containers of data are deleted from the dataset.

12. The method of claim 1, further comprising:
reclaiming the determined amount of storage space in the storage system subsequent to deletion of the plurality of logical containers of data.

13. The method of claim 1, wherein, each of the one or more data blocks is a deduplicated data block.

14. A method of determining an amount of storage space that would be reclaimed in a storage system through deletion of a plurality of logical containers of data, the method comprising:
receiving, at a storage controller, a request to determine an amount of storage space that will be reclaimed through deletion of a first plurality of logical containers of data from a dataset of a storage system, each of the plurality of logical containers of data including references to one or more data blocks stored in the dataset;
calculating, by the storage controller, a first reference count for each data block of the one or more data blocks referenced by the first plurality of logical containers of data, wherein the first reference count of a particular data block is a total number of references made to the particular data block by the first plurality of logical containers of data;
determining a total amount of storage space that would be reclaimed through deletion of the first plurality of logical containers of data, by:
for each data block, comparing the first reference count with an overall reference count associated with the data block, wherein the overall reference count associated with the data block is a total number of references made to the data block by all logical containers of data stored in the dataset;
determining that the data block will be physically deleted when the first reference count matches the associated overall reference count;
determining that the data block will not be physically deleted when the first reference count does not match the associated overall reference count;
determining, by the storage controller, an amount of storage space that will be reclaimed in the storage volume through deletion of the first plurality of logical containers of data, by calculating a total amount of storage space utilized by each data block for which the first reference count matches the overall reference count.

15. The method of claim 14, wherein the first plurality of logical containers of data is a partial subset of all logical containers of data stored in the dataset.

16. The method of claim 15, wherein the files of the first plurality of logical containers of data are listed in a specific order as indicated by a user of the storage system, the specific order being one of:
an order based on a storage age of each of the first plurality of logical containers of data;
an order based on an importance value associated with each of the first plurality of logical containers of data; or
an order based on a storage size utilized by each of the first plurality of logical containers of data.

17. The method of claim 16, further comprising:
calculating, by the storage controller, a sub-storage value for each of the first plurality of logical containers of data, wherein the sub-storage value of a particular logical container of data of the first plurality of logical containers of data is an amount of storage space that would be reclaimed through deletion of the particular logical container of data and a list of logical containers of data listed before the particular logical container of data in the specific order of the first plurality of logical containers of data.

18. The method of claim 16, further comprising:
calculating, by the storage controller, a sub-storage value for each of the first plurality of logical containers of data, wherein the sub-storage value of a particular logical container of data of the first plurality of logical containers of data is an amount of storage space that would be reclaimed through deletion of the particular logical container of data and a list of logical containers of data listed after the particular logical container of data in the specific order of the first plurality of logical containers of data.

19. The method of claim 14, further comprising:
reclaiming, by the storage controller, the determined amount of storage space in the storage system subsequent to deletion of the plurality of logical containers of data.

20. The method of claim 14, wherein, each of the one or more data blocks is a deduplicated data block.

21. The method of claim 14, wherein the dataset is a particular storage volume of the storage system.

22. The method of claim 14, wherein the dataset includes a plurality of storage volumes of the storage system.

23. A method of determining storage space that would be reclaimed in a storage volume of a storage system through deletion of a plurality of logical containers of data, the method comprising:
identifying a plurality of logical containers of data to be deleted from a dataset of a network storage system, each of the plurality of logical containers of data including references to one or more data blocks stored in the dataset;
for each data block of the one or more data blocks referenced by the identified plurality of logical containers of data, performing a set of operations using a storage controller of the network storage system, the set of operations including:
calculating a total number of references to the data block made by the identified plurality of logical containers of data;
comparing the total number of references against an overall reference count associated with the data block, wherein the overall reference count is a number of references to the data block made by all logical containers of data stored in the dataset; and earmarking the data block if the total number of references matches the overall reference count associated with the data block; and determining, by the storage controller, an amount of storage space that will be reclaimed through deletion of the identified plurality of logical containers of data, by calculating a total amount of storage space utilized by each earmarked data block.

24. A storage controller comprising:
a processor;
a memory storing code which, when executed by the processor, causes the storage controller to perform a process, including:
identifying a plurality of logical containers of data to be deleted from a dataset of a storage system, each of the plurality of logical containers of data including references to one or more data blocks stored in the dataset, an indication of the plurality of logical containers of data having been input into the storage controller by a user for determining a total amount of physical storage space that would be freed up in the storage system upon deletion of the plurality of logical containers of data;
calculating a total number of references made to each individual data block by the identified plurality of logical containers of data; and
determining the total amount of storage space that would be reclaimed through deletion of the identified plurality of logical containers of data, by:
identifying, by the storage system, a total number of individual data blocks, among all data blocks referenced by the identified plurality of logical containers of data for which the total number of references made by the identified logical containers of data matches an overall reference count associated with such individual data blocks, wherein the overall reference count associated with a given data block is an overall number of references made to the given data block by all logical containers of data stored in the dataset;
calculating a total amount of storage space utilized within the storage system by the identified total number of individual data blocks that match the overall reference count; and
determining the calculated overall amount of storage space as the total amount of storage space that would be reclaimed.

25. The storage controller of claim 24, wherein the dataset is a particular storage volume of the storage system.

26. The storage controller of claim 24, wherein the dataset includes a plurality of storage volumes of the storage system.

27. The storage controller of claim 24, wherein the identified plurality of logical containers of data is a partial subset of all logical containers of data stored in the dataset.

28. The storage controller of claim 27, wherein the logical containers of data of the identified plurality of logical containers of data are listed in a specific order as indicated by a user of the storage system, the specific order being one of:

an order based on a storage age of each of the plurality of logical containers of data;
an order based on an importance value associated with each of the plurality of logical containers of data; or
an order based on a storage size utilized by each of the plurality of logical containers of data.

29. The storage controller of claim 28, wherein the process performed by the network storage system further comprises:
calculating a sub-storage value for each of the identified plurality of logical containers of data, wherein the sub-storage value of a particular logical container of data of the identified plurality of logical containers of data is an amount of storage space that would be reclaimed through deletion of the particular logical container of data and a list of logical containers of data listed before the particular logical container of data in the specific order of the identified plurality of logical containers of data.

30. The storage controller of claim 28, wherein the process performed by the storage controller further comprises:
calculating a sub-storage value for each of the identified plurality of logical containers of data, wherein the sub-storage value of a particular logical container of data of the identified plurality of logical containers of data is an amount of storage space that would be reclaimed through deletion of the particular logical container of data and a list of logical containers of data listed after the particular logical container of data from the specific order of the identified plurality of logical containers of data.

31. The storage controller of claim 24, wherein the overall reference count associated with each of the one or more data blocks is maintained in the dataset.

32. The storage controller of claim 24, wherein the overall reference count associated with each of the one or more data blocks is dynamically calculated prior to determining the amount of storage space that would be reclaimed through deletion of the identified plurality of logical containers of data.

33. The storage controller of claim 24, wherein, a particular data block, for which the total number of references matches an associated overall reference count, is deleted from the storage volume when the plurality of logical containers of data are deleted from the storage volume.

34. The storage controller of claim 24, wherein, a particular data block, for which the total number of references does not match an associated overall reference count, is not deleted from the storage volume when the plurality of logical containers of data are deleted from the storage volume.

35. The storage controller of claim 24, wherein the process performed by the storage controller further comprises:
reclaiming the determined amount of storage space in the storage volume subsequent to deletion of the plurality of logical containers of data.

36. The storage controller of claim 24, wherein, each of the one or more data blocks is a deduplicated data block.

* * * * *